Feb. 20, 1940.   O. HENZE   2,190,786

FISHING REEL

Filed July 29, 1938

Inventor:
OTTO HENZE
By *L. Edelson*
Attorney.

Patented Feb. 20, 1940

2,190,786

UNITED STATES PATENT OFFICE 2,190,786

FISHING REEL

Otto Henze, Philadelphia, Pa.

Application July 29, 1938, Serial No. 221,875

3 Claims. (Cl. 242—84.5)

This invention relates generally to an improved construction of fishing reel and more particularly to an improved type of anti-back-lash mechanism for preventing the overrunning of fish reel spools.

Among the principal objects of the present invention is to provide in a fishing reel an exceedingly simple and effective means for preventing such back-lash or overrunning of the spool with respect to the line being cast as results in entanglement of the line on the spool. In the use of free spool fishing reels it is necessary, particularly when casting, for the fisherman to restrain somewhat the velocity of rotation of the spool as the line is unwound therefrom because, if the spool is permitted to rotate with unimpeded velocity, particularly at the start and during the first part of the cast, the spool velocity so exceeds the speed with which the line leaves the spool that reverse winding and consequent entanglement of the line on the spool results.

The anti-back-lash mechanisms heretofore employed almost invariably have employed in one form or another spring-pressed brakes which were operative, immediately upon cessation of unwinding of the line from the reel, to frictionally engage and so arrest the further rotation of the spool. Not only are these mechanisms relatively expensive and frequently the source of mechanical difficulties, but their action being controlled by the line cast from the reel necessarily imposes a certain amount of drag on the line itself, which interferes with its proper cast.

According to the present invention the reel is provided with an air-brake which operates independently of the line cast from the spool to sharply reduce the rotative velocity of the latter as the lure on the line approaches its ultimate destination; the arrangement being such that while a maximum braking effort is imposed on the reel during the initial part of the cast, this effort is reduced accordingly as the speed of the line withdrawn from the reel spool is decreased with corresponding decrease in the rotative speed of the spool.

Other objects and advantages of the invention will appear more fully hereinafter, it being understood that the present invention consists substantially in the combination, construction, location and relative arrangement of parts, all as will appear more fully hereinafter, as shown in the accompanying drawing, and as finally pointed out in the appended claims.

Figure 1:
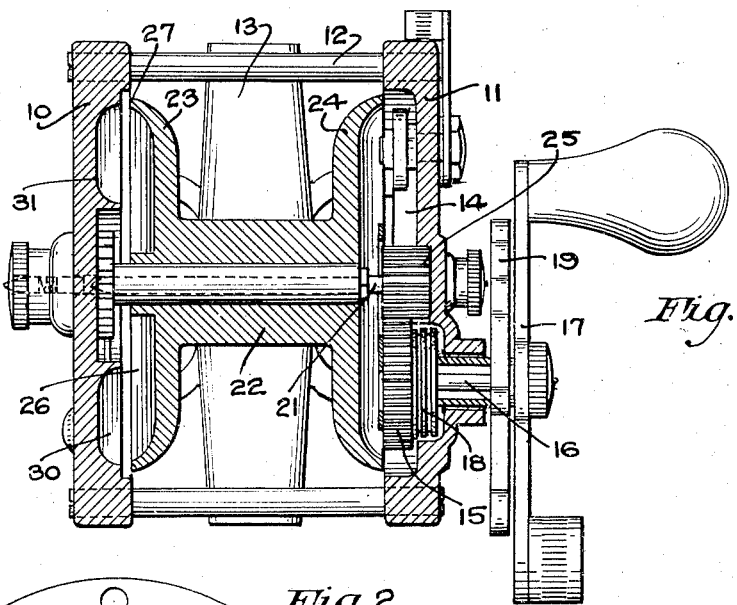
Figure 1 is a cross-sectional view of a reel constructed in accordance with and embodying the principles of the present invention.

Referring now more particularly to the drawing, it will be observed that the reel comprises a pair of end plates or discs 10 and 11 which are secured together in the assembled relation shown by a plurality of pillars 12 and by a cross plate 13 to which latter a fishing rod (not shown) is adapted to be secured.

As appears most clearly in Figure 1, the end plate 11 is suitably recessed, as at 14, to accommodate a main driving gear 15 the shaft 16 of which projects exteriorly of the end plate 11, the extremities of this shaft 16 being adapted to receive a suitable operating lever or handle 17 for imparting rotation to the main driving gear. Preferably interposed between the operating handle 17 and the main driving gear 15 is a drag unit 18 the adjustment of which may be effected by means of a suitably arranged star wheel 19. Although this drag unit forms no part of the present invention, it will be understood that by rotating the star wheel 19 in one direction or the other the amount of friction or drag between the operating handle 17 and the gear 15 may be adjusted to any desired degree so that, if desired, the spool may be unwound by a baited fish upon overcoming the friction or drag in the handle. Any suitable drag unit may be interposed between the operating handle 17 and the main driving gear 15.

Centrally provided in the end plate 11 is an interiorly threaded aperture within which is adapted to be threadedly secured an end bearing element for one end of the reel spindle or shaft 21, the reel assembly of which the spindle 21 forms a part including a spool 22 having dished opposite ends 23 and 24. Operatively associated with the spool 22 and in mesh engagement with the main driving gear 15 is a second gear 25, this latter gear being axially shiftable in such manner that it may be brought into and out of driving engagement with the spool spindle 21 without, however, effecting its disentrainment with respect to the main driving gear 15.

The above described construction and the mechanism for effecting the axial movement of the driven gear 25 into and out of driving engagement with the spool spindle 21 are shown and described in detail in my prior Patent No. 1,940,593, dated December 19, 1932, and hence further detailed description thereof is not deemed necessary for a complete understanding of the present invention which will now be described.

Figure 2:
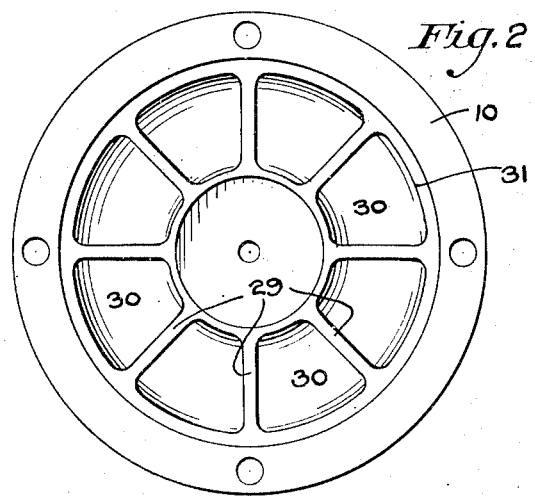
Figure 2 is an elevational view of the inner face of one of the end members of the reel.
Figure 3:
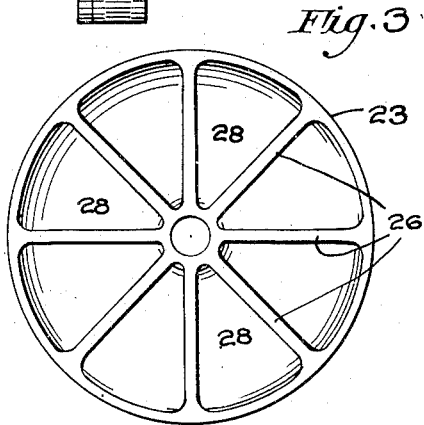
Figure 3 is an elevational view of the outer face of the spool per se.
Figure 4:
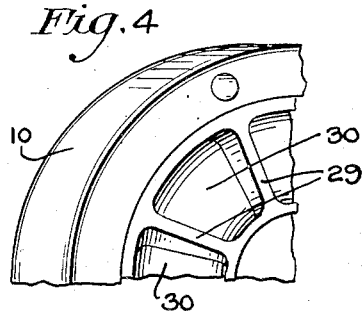
Figures 4 and 5 are fragmentary perspective views of the parts respectively shown in Figures 2 and 3.
Figure 5:
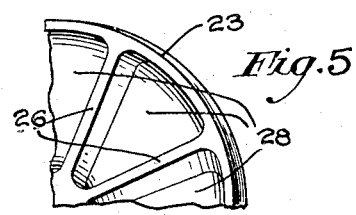

As appears most clearly in Figures 1, 3 and 5, the dished end member 23 of the spool 22 is provided with a plurality of radially extending webs 26 the outer edges of which are commonly disposed in the plane of the spool rim 27. These webs 26 form a series of pockets 28 of substantially triangular shape in which air may be trapped during rotation of the spool 22. Also, as appears most clearly in Figures 1, 2 and 4, the inner face of the reel end member 10 is provided with a series of circumferentially spaced air pockets 30 formed by a plurality of webs 29 extending radially across an annular groove 31 provided in the end member in any suitable manner. It will be observed that the stationary air pockets 30 are so disposed relatively to the air pockets 28 in the rotatable spool that as the latter rotates during the operation of casting the line (not shown) from the reel, air currents are induced within the space intervening the reel end member 10 and the proximate end 22 of the spool by the fanning action of the webs 26 rotating relatively to the webs 29. These webs 26 thus act as blades or paddles to circulate air out of the air pockets 28 and into the stationary air pockets 30 and so set up an air resistance sufficient to provide a braking influence upon the rotating reel spool 22.

It will be apparent that when the reel spool 22 is rotated at maximum velocity, as during the initial part of the casting operation, the air resistance induced as above described is of relatively high order, this air resistance being decreased in accordance with the reduction in the speed of rotation of the reel spool. However, the velocity with which the latter rotates is at all times under the control of the air brake in consequence of which, as the line is cast from the reel, the rotative speed of the reel spool is so reduced by the action of the air brake thereon, that overrunning of the spool due to its own momentum will not occur and entangling of the line upon the spool will thereby be prevented.

While the present invention has been illustrated as embodied in a reel of the type shown and described in my prior Patent No. 1,940,593, above referred to, it will be understood, of course, that it is as well applicable to and may be embodied in other types of fishing reels. Also, it will be understood that the invention is susceptible of various changes and modifications which may be made from time to time without departing from the real spirit or general principles thereof. Accordingly, the present invention is claimed broadly, as well as specifically, as indicated in the appended claims.

What is claimed as new and useful is:

1. In a fishing reel, in combination, a pair of end plates, a spool rotatable therebetween, said spool having at one end thereof an enlarged flange the outer face of which is inwardly dished, and a plurality of radial webs disposed in said dished face of the flange to form recessed air pockets therein, whereby as said spool is rotated air is trapped in said pockets to provide a braking influence upon said rotating spool, the degree of air resistance to rotation of the spool being in accordance with the speed of rotation of the latter.

2. In a fishing reel, in combination, a pair of end plates, a spool rotatable therebetween, said spool being provided in one end surface thereof with a plurality of recessed air pockets, and a plurality of coacting air pockets provided in the proximate surface of one of said end plates whereby upon rotation of said spool air is trapped in said pockets to provide a braking influence upon the rotating spool.

3. In a fishing reel, in combination, a frame adapted to be secured to a fishing rod, a spool rotatably mounted in said frame, means for operating the spool to wind a line thereon and for effecting its free rotation when the line is unwound therefrom, a plurality of circumferentially spaced recessed air pockets formed in one end of said spool, and a plurality of circumferentially spaced air pockets formed in the frame in such proximate relation to said spool pockets that upon rotation of the spool said air pockets in the spool and frame coact to induce an air resistance providing a braking influence upon the rotating spool.

OTTO HENZE.